UNITED STATES PATENT OFFICE.

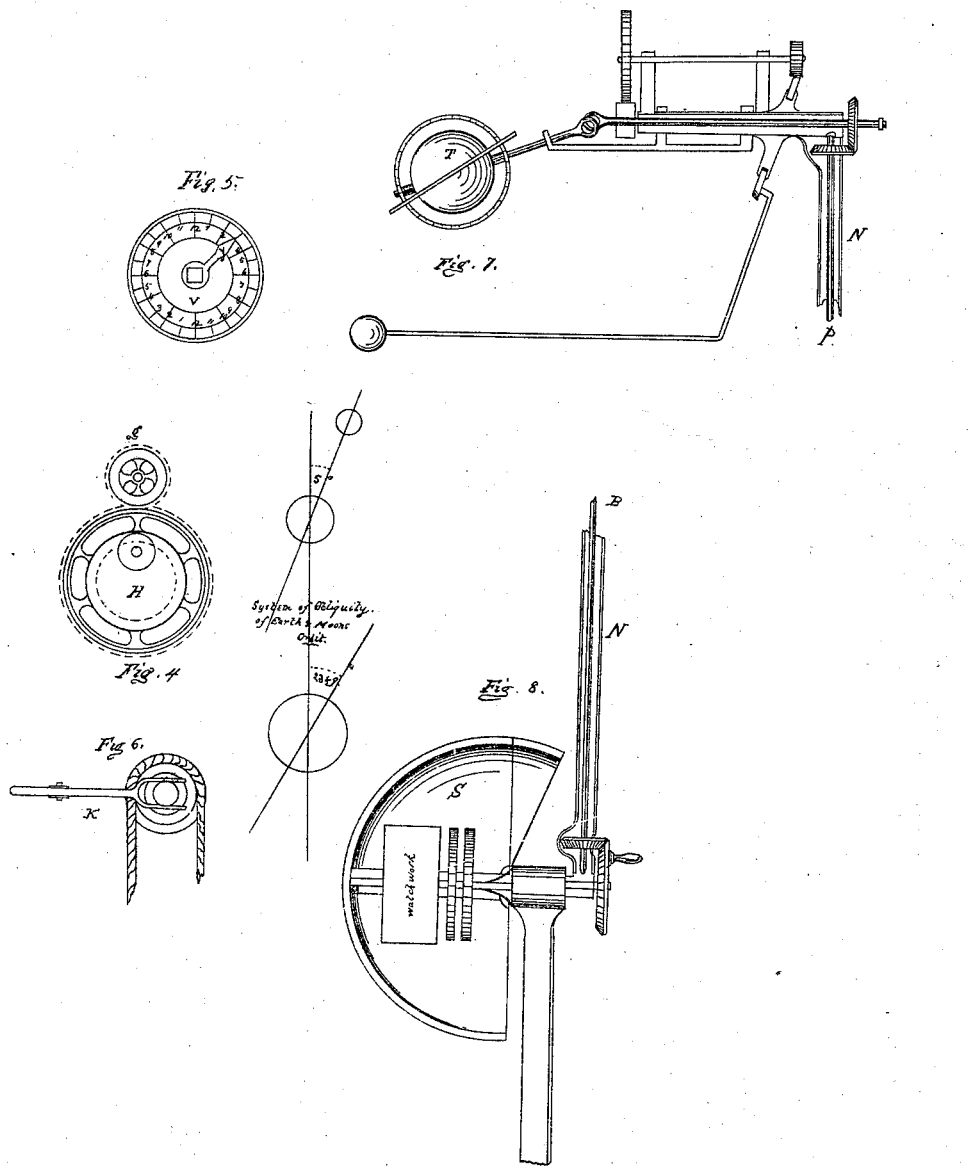

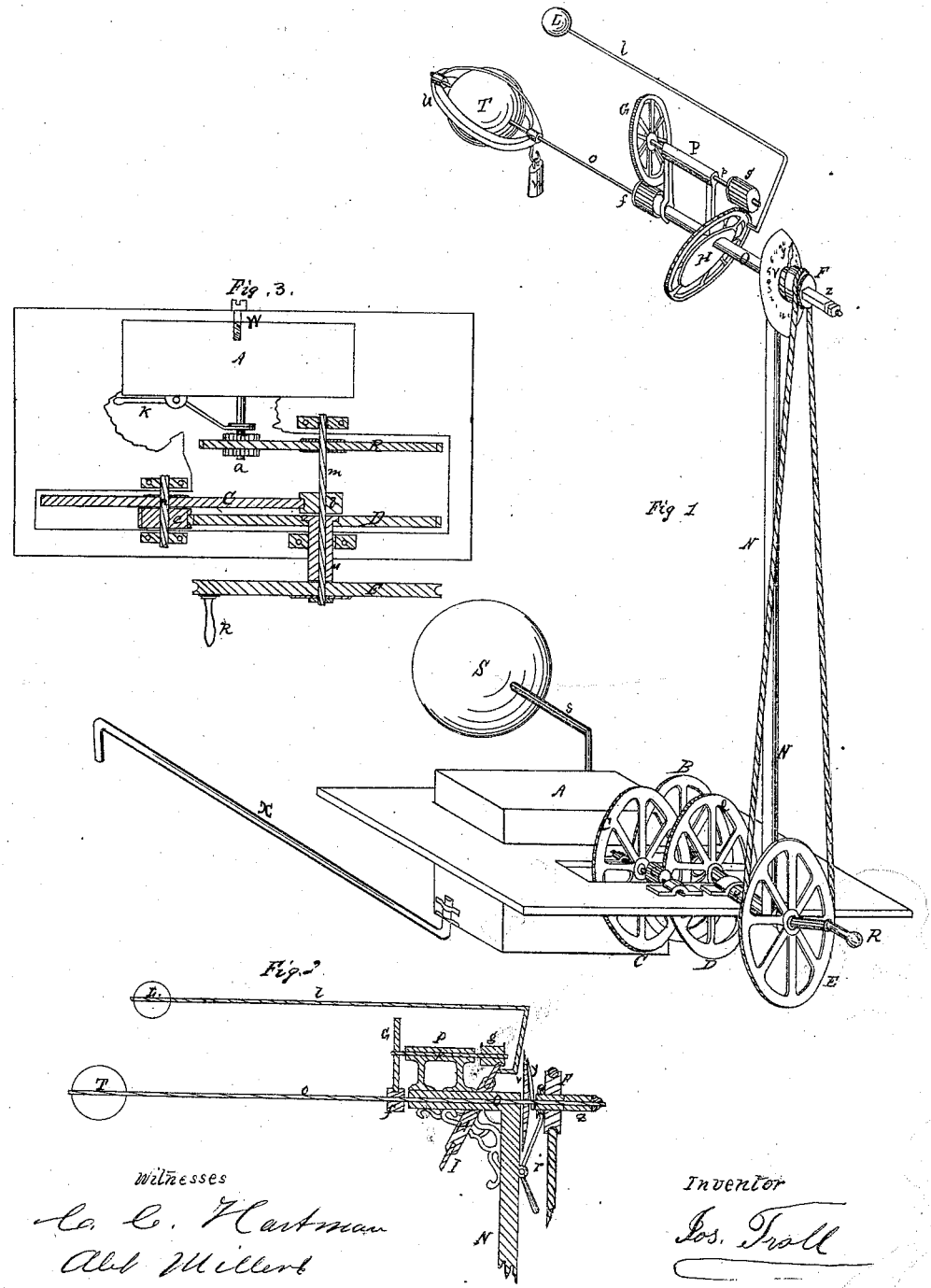

JOSEPH TROLL, OF BELLEVILLE, ILLINOIS.

IMPROVEMENT IN TELLURIANS.

Specification forming part of Letters Patent No. 117,579, dated August 1, 1871.

*To all whom it may concern:*

Be it known that I, JOSEPH TROLL, of Belleville, in the county of St. Clair and State of Illinois, have invented a new and Improved Tellurian; and I do hereby declare that the following is a full, clear, and exact description of the same, reference being had to the accompanying drawing forming a part of this specification.

My invention relates to improvements in tellurians; and consists in the arrangement of parts for illustrating the inclination of the earth's axis, for disengaging the lunar globe from the terrestrial, and in the apparatus as a whole, whereby I secure, by simple and inexpensive means, what has hitherto required complicated and costly ones.

Figure 1 is a perspective view of my improved tellurian, and Fig. 2 a vertical section of a part thereof. Fig. 3 is a horizontal section through the axis of the gearing which regulates the movement of the earth-globe. Figs. 4, 5, 6 represent detached parts or devices of my apparatus. Fig. 7, Sheet II, shows a modification of the apparatus shown in Fig. 2, Sheet I; and Fig. 8, a section of the sun-globe with the watch-work inclosed.

In the several figures, C represents the sun-globe, T the earth, and L the moon, while $s$, $o$, and $l$ are the respective extended axes of the same. M indicates a hollow shaft, on whose respective inner and outer ends are keyed the cog-wheels D and driving-pulley E, provided with a handle R. The standard N is firmly attached to the said shaft M, and carries at its outer extremity the whole daily and monthly train. In the hollow shaft M revolves a solid shaft, $m$, which carries the pinion $b$ and cog-wheel B. The pinion $c$ and cog-wheel C, on shaft $n$, mesh respectively with the wheel D and pinion $b$. Movement is imparted to the train by the pinion $a$, which meshes with wheel B, and whose shaft is rotated by watch-work placed within the case or box A, or in the sun-globe itself, as in Fig. 8. A lever, K, serves to throw the pinion $a$ into or out of gear with wheel B, so that the train may be operated by turning the wheel E by hand whenever desired. The operation of the parts composing the train results in imparting to the entire daily and monthly train a rotation in a vertical plane about the sun-globe. The terrestrial globe T is fixed on a shaft, $o$, having a pinion, $f$, and passes through the hollow shaft O. The latter carries an obliquely-set wheel, H, which gears with a pinion, $g$, on the shaft $p$, turning in bearings P. On the other end of shaft $p$ is a cog-wheel, G, which meshes with the pinion $f$. The lunar globe L is carried at one end of a shaft or arm, $l$, whose inner end is bent at a right angle and fixed in the wheel H near the edge. The obliquity of the moon's orbit is effected by the wheel H. U indicates a horizon and a graded meridian for the earth-globe T. The device is provided with a weight, W, to preserve the horizontal position of the horizon; or it may be fastened to the earth with a pin, so as to rotate with it. The pulley F may be slid, by lever $r'$, on the loose collar $z$, when it is desired to cause the lunar globe to cease. $v$ and $y$ indicate a dial-plate and pointer for noting the degree of revolution of the earth-globe.

In Fig. 7 I have shown the axis of the earth-globe jointed, for the purpose of illustrating the inclination of the earth's axis upon the elliptic, which causes the change of seasons on the earth. In this case bevel-gears are employed to transmit motion, but I prefer the band connection shown in Fig. 1.

It will be perceived from the foregoing that the whole daily and monthly train move in a vertical plane about the sun by means of an automatic motor—as watch-work—or by hand, which better adapts the application for use in both schools and lecture-rooms; that the axis of the earth is shown inclined; the horizon both fixed and movable; and that the lunar globe may be easily thrown out of action when it is desired to illustrate the movement of the earth alone.

I make no claim, broadly, to so arranging an earth-globe as to rotate upon an inclined axis-rod; nor to a meridian in connection with an earth-globe; nor, indeed, to most of the devices, specifically, whereof my improved apparatus is composed; but

Having thus described my invention, what I claim as new, and desire to secure by Letters Patent, is—

1. The earth-globe T, arranged to rotate upon the axis-rod, jointed so as to incline as shown in Fig. 7, for the purpose specified.

2. The improved tellurian herein described, composed of the several parts, all constructed, combined, and arranged as shown and described.

3. The pulley F and collar $z$, in combination with the shaft $o$, lunar globe L, wheel H, and intermediate connecting parts, as specified.

JOS. TROLL.

Witnesses:
 HUGO ROPIEGUET,
 DANIEL HERTLY.